United States Patent [19]

Huffman

[11] 4,068,549
[45] Jan. 17, 1978

[54] PICKER STICK FEED AND SAWING DEVICE

[76] Inventor: James Earle Huffman, 42 Stone Haven Drive, Greenville, S.C. 29607

[21] Appl. No.: 754,589

[22] Filed: Dec. 27, 1976

[51] Int. Cl.² .............................................. B27B 5/04
[52] U.S. Cl. .................................... 83/417; 83/425.2; 83/435.2; 83/437
[58] Field of Search ...................... 83/417, 425, 425.2, 83/425.3, 425.7, 435.2, 437

[56] References Cited

U.S. PATENT DOCUMENTS

| 345,758 | 7/1886 | Barnes | 83/417 |
| 2,298,955 | 10/1942 | Mason et al. | 83/417 |

Primary Examiner—Donald R. Schran
Attorney, Agent, or Firm—Bailey, Dority & Flint

[57] ABSTRACT

An apparatus for conveying and positioning wooden blanks relative to spaced rotating saw blades. The blanks are fed into a hopper and are lifted from the hopper on dogs carried on opposed conveyer chains. Inclined members are carried adjacent the run of the chain for engaging the wooden blanks as they are raised on the dogs forcing improperly positioned wooden blanks off the conveyor chain. A spring biased pivotal arm is provided for forcing the wooden blanks against a guide rail for properly positioning the blanks for sawing.

5 Claims, 3 Drawing Figures

PICKER STICK FEED AND SAWING DEVICE

BACKGROUND OF THE INVENTION

Heretofore, in the manufacture of picker sticks in one particular process wooden blanks are sawed from substantially square laminated pallets. The blanks were then fed individually into a saw for sawing them into the proper length. It is important that these blanks be fed to the spaced rotating saw blades mechanically so as to positively hold the blanks while being sawed so as to prevent them from being accidentally thrown from the saw. Heretofore, this has required a worker to manually feed the blanks coming out of an end trimmer into the saw.

SUMMARY OF THE INVENTION

The invention includes an apparatus for conveying and positioning wooden blanks relative to spaced rotating saw blades so that the blanks can be sawed into predetermined lengths for use as picker sticks. The apparatus includes a hopper which receives the sawed wooden blanks from an end trimmer. The hopper has a substantially V-shaped cross section with an arcuate shaped forward wall. A pair of opposed endless conveyer chains run up through the bottom of the hopper up over the forward wall. Aligned dogs are carried on the opposed chains for engaging and lifting the wooden blanks as the dogs pass through the hopper. Inclined members are carried on the front wall of the hopper for engaging the wooden blanks as they are raised on a pair of the spaced dogs, forcing improperly positioned wooden blanks off of the conveyer chain. The inclined members extend outwardly from the front wall and terminate short of an outer surface of the dogs.

The run of the conveyor chains pass under the saw blades so that the opposed ends of the wooden blanks are cut off as the blanks are transported past the saw blades. A guide rail is interposed between the hopper and the saw blades. A spring biased pivotal wall engages the ends of the wooden blanks and forces them against the guide rail so as to properly position the blanks relative to the saw blades for sawing.

A wedge-shaped member is carried on the front wall adjacent the bottom of the hopper closely adjacent to the run of one of the chains. The wedge-shaped member is inclined from the front wall outwardly beyond the chain remote from the end trimmer feeder. Thus, as the wooden blanks are deposited in the hopper, they are prevented from abutting against the side of the remote chain.

Accordingly, it is an object of the present invention to provide an apparatus for automatically conveying and positioning picker stick blanks relative to a pair of spaced saw blades so that they can be sawed into the proper lengths.

Another important object of the present invention is to provide a conveying system which insures properly positioning of picker stick blanks on conveyer chains for feeding to rotating saw blades.

These and other objects and advantages of the invention will become apparent upon reference to the following specification, attendant claims, and drawings.

DESCRIPTION OF A PREFERRED EMBODIMENT

Figure 1:
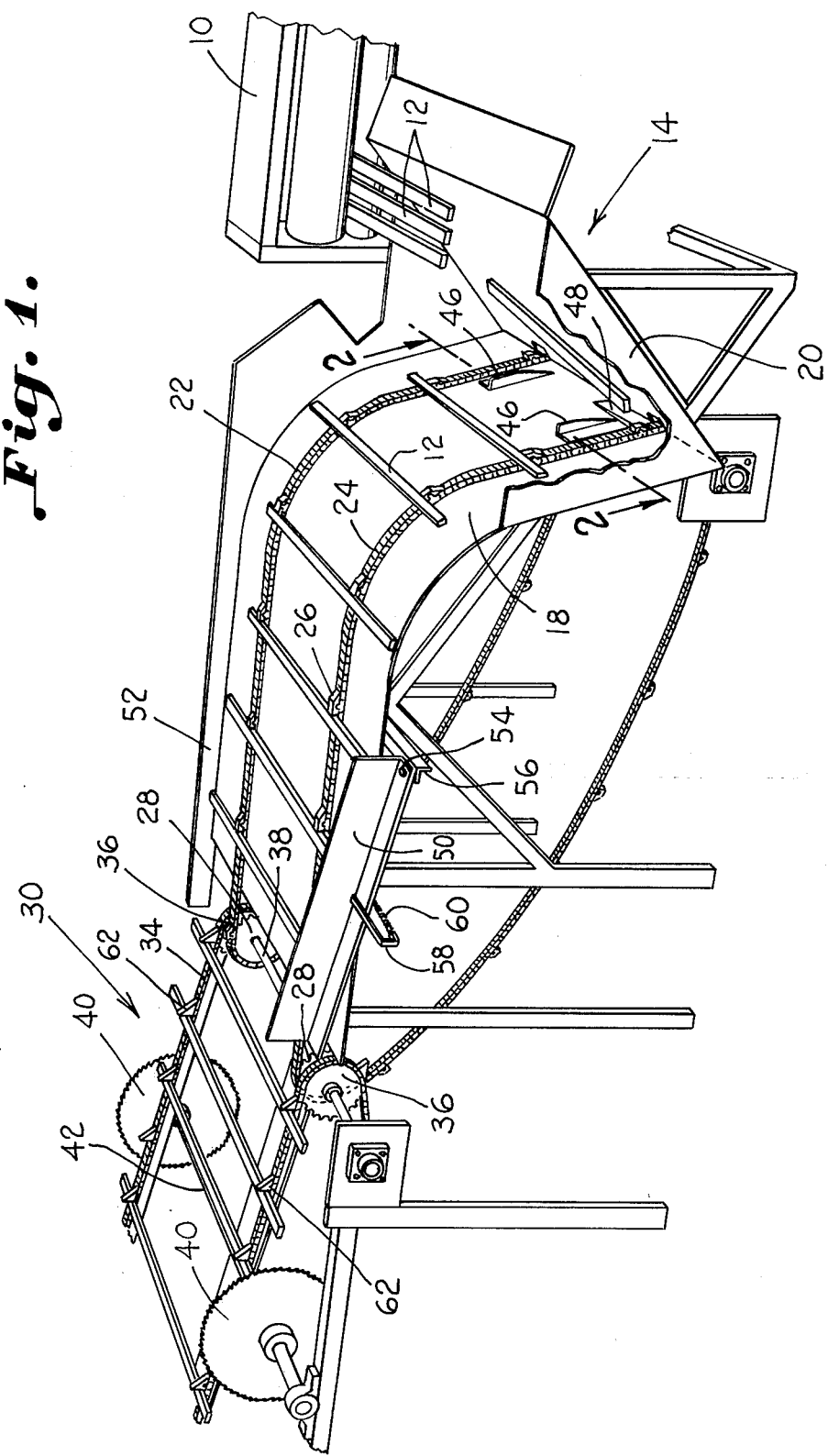
FIG. 1 is a perspective view partially in schematic form illustrating an apparatus constructed in accordance with the present invention.
Figure 2:
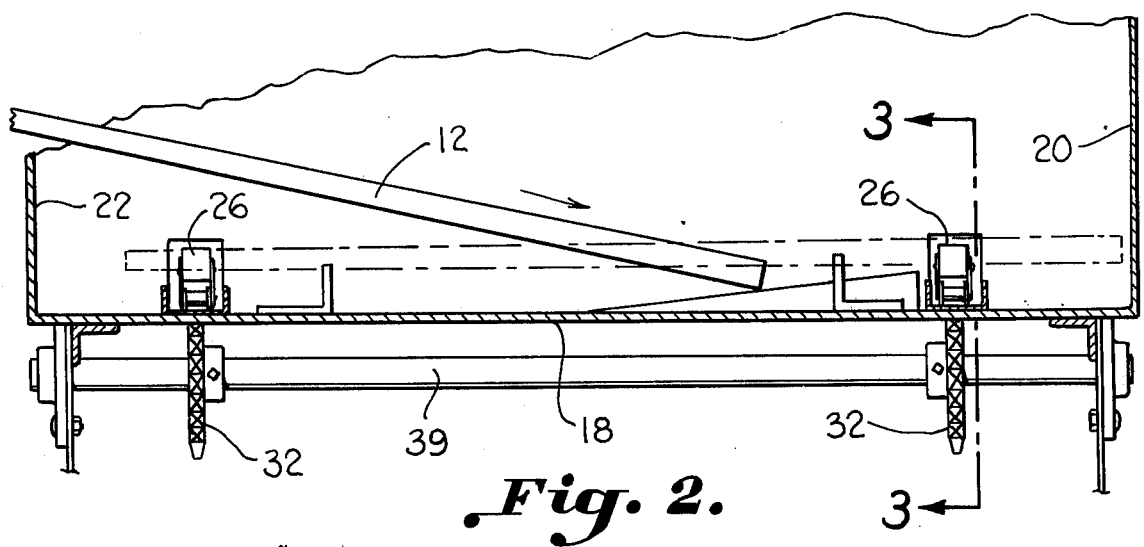
FIG. 2 is a sectional view taken along line 2—2 of FIG. 1.
Figure 3:
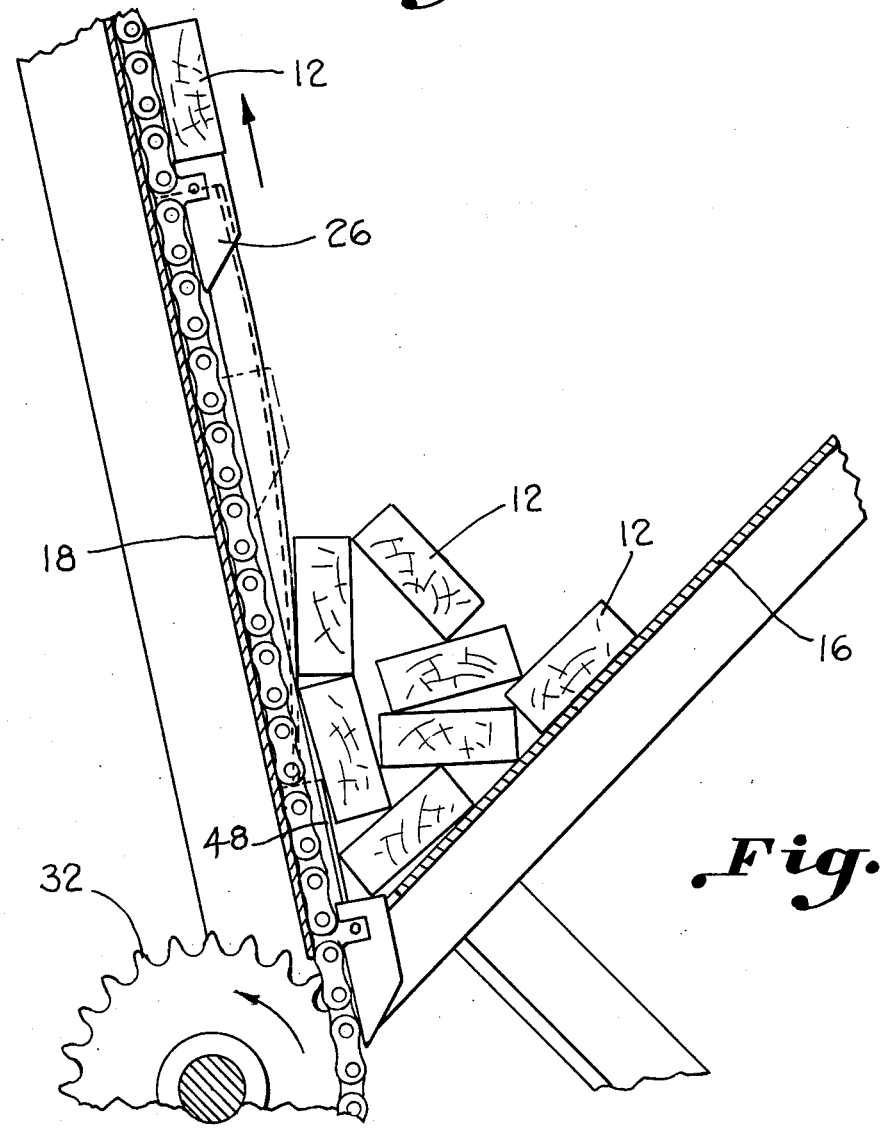
FIG. 3 is a sectional view taken along line 3—3 of FIG. 2.

Referring in more detail to FIG. 1, there is illustrated an end trimmer 10 which saws a blank board into a plurality of wooden blanks 12 and deposits these wooden blanks 12 into a hopper, generally designated by the reference character 14. The hopper includes an inclined rear wall 16 which is joined by a front wall 18. The walls 18 and 20 are supported on suitable bracing, all of which are not shown for purposes of clarity. The ends of the hopper 14 are closed with end walls 20 and 22. End wall 20 is shown broken away. A pair of opposed endless conveyer chains 22 and 24 run up through the bottom of the hopper 14 over the forward wall 18. It is noted that the forward wall 18 extends upwardly at an angle and then includes an arcuate portion of slightly greater than 99° which terminates in a flat portion.

Positioned on the conveyer chain 22 are spaced dogs 26. The dogs carried on the opposed chains 22 and 24 are aligned with each other. The dogs have a flat front portion which extend approximately 1⅜ inches outwardly from the face of the front wall 18. The conveyer chains 20 and 22 extend around a pair of sprockets 28 carried adjacent the front portion of a saw and another pair of sprockets 32 are carried adjacent the bottom of the hopper. The sprockets 28 and 32 are fixed on rotatable shafts 38 and 39, respectively. The drive for the sprockets 28 and 32 is taken from conveyer chain 34 forming part of the saw 30. the conveyer chains 34 extend around sprockets 36 carried on shaft 38 upon which the sprockets 28 are secured. The chains 34, in turn, rotate the shaft 38 for driving the sprockets 28. Any suitable conventional drive can be used for driving the pair of conveyer chains 34 forming part of the saw, and such are not disclosed for purposes of clarity.

A pair of saw blades 40 are carried on a rotatable shaft 42. The shaft 42 may be driven in any suitable manner for rotating the saw blades forwardly.

In the bottom of the V-shaped hopper positioned on the front wall are a pair of spaced inclined members 46 that are constructed of angle iron that are tapered from approximately flush against the front wall outwardly for approximately 1 inch. Also positioned in the bottom of the hopper is a wedge-shaped member 48 that terminates short of the chain 24 so that as the blanks 12 are dumped into the hopper such will cause the blanks to be fed over the conveyer chain 24 and not abut flush thereagainst.

In operation, as the wooden blanks are sawed by the end trimmer 10, they are dumped into the V-shaped hopper 14. The ends of the sticks will normally engage the wegde-shaped member 48 prior to abutting against the end wall 20 of the hopper. As the conveyer chains 22 rotate in a counter-clockwise direction, the dogs 26 carried on the chains 22 and 24 engage the sticks 12.

The blanks or sticks 12 are more or less tumbled until a blank fits flush against the ends of a pair of dogs 26. When this occurs, the blank is raised with the inner surface of the blank engaging the inclined members 46 as it is raised out of the hopper. The inclined surfaces 46 tend to push the blank to the outer edge of the dogs 26. If there is only a single blank carried on the dogs and such is aligned properly between the two dogs 26, the stick remains balanced on the dogs and is lifted up around the arcuate portion of the table and is fed to the saw. However, if the blank or two or more blanks are improperly positioned on the dogs as the dogs are raised out of the hopper they are forced off. As the blanks 12 are raised up over the front of the hopper, the forward end of the blank engages a pivotal plate 50 that pushes the other end of the blank flush against a guide rail 52. The plate is pivoted about a vertically extending pivot joint 54 carried on angle irons 56. Arms 58 extend outwardly from the back side of the pivotal plate 50 and a spring 60 extends from the other end of the arm 58 to the conveyer table.

As a result of the pivotal plate 50, when the blanks 12 reach the end of the conveyer chain which is approximately over the sprockets 28 they are aligned for proper cutting by the saw blades 40. They are also transferred at this time to the conveyer chains 34 forming part of the saw. It is noted that the conveyer chains 34 also have dogs 62 provided thereon for holding the blanks 12 as they are fed between the saw blades. The dogs 62 are much larger than the dogs 26 carried on the other chains.

While a preferred embodiment of the invention has been described using specific terms, such description is for illustrative purposes only, and it is to be understood that changes and variations may be made without departing from the spirit or scope of the following claims.

What is claimed is:

1. An apparatus for conveying and positioning wooden blanks relative to rotating saw blades carried in spaced relation on a rotating shaft so that said blanks can be sawed into a predetermined length for use as picker sticks, said apparatus comprising:
    a. a hopper for receiving said wooden blanks,
    b. said hopper having a substantially "V" shaped cross-section with a forward wall thereof being arcuate,
    c. a pair of opposed endless conveyor chains running up through the bottom of said hopper up over said forward wall,
    d. aligned dogs carried on said opposed chains for engaging and lifting said wooden blanks as said dogs pass through said hopper,
    e. inclined members carried on said front wall of said hopper for engaging said wooden blanks as they are raised on a pair of spaced dogs forcing improperly positioned wooden blanks off of said conveyor chains,
    f. said inclined members extending outwardly from said front wall and terminating short of an outer surface of said dogs, said run of said conveyor chains passing under said saw blades so that opposed ends of said wooden blanks are cut off as said blanks are transported past said saw blades.

2. The apparatus as set forth in claim 1 further comprising:
    a. a guide rail carried adjacent the run of one of said endless chains, and
    b. means for forcing said wooden blanks against said guide rail for positioning said wooden blanks relative to said pair of saw blades so that the ends of said blanks are cut off as said blanks are fed into said saw blades.

3. The apparatus as set forth in claim 1 wherein said means for forcing said wooden blanks against said guide rail includes:
    a. a resiliently biased wall carried adjacent the run of said chain on a side opposite from said guide rail for engaging an end of said wooden blanks and forcing the other end of said wooden blanks against said guide rail.

4. The apparatus as set forth in claim 1 further comprising:
    a. a wedge-shaped member carried on said front wall adjacent to the bottom of said hopper closely adjacent to the run of one of said chains,
    b. said wedge-shaped member being inclined from said front wall outwardly beyond said one of said chains, whereby when wooden blanks are fed into said hopper from a side opposite from where said one of said chains is running, said wedge-shaped member prevents the end of said wooden blanks from abutting against said one chain.

5. The apparatus as set forth in claim 1 wherein each of said pair of opposed endless chains includes:
    a. a pair of aligned chains, and
    b. means for synchronizing the driving of all of said chains relative to each other.

* * * * *